Jan. 27, 1948.  F. A. BARNES  2,435,026
WELDING CONTROL SYSTEM
Filed June 26, 1944
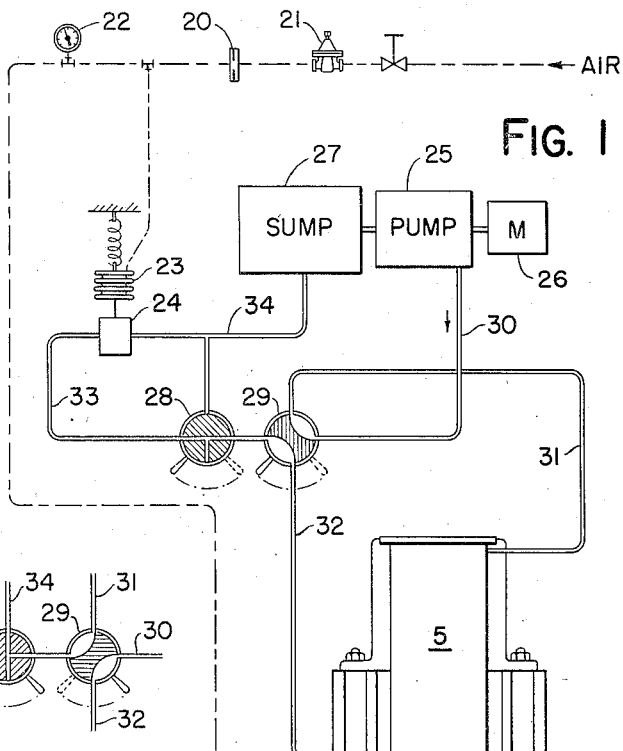
FIG. 1
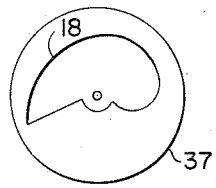
FIG. 6
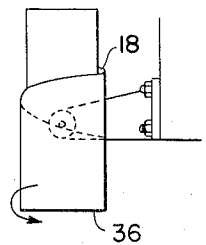
FIG. 5
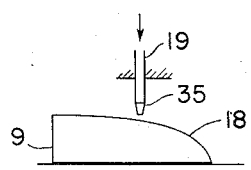
FIG. 2
FIG. 4
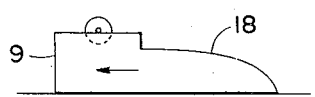
FIG. 3
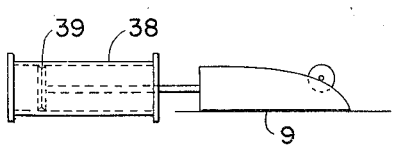
FIG. 7
Inventor
FREDERICK A. BARNES
By Raymond D. Junkins
Attorney Patented Jan. 27, 1948

2,435,026

UNITED STATES PATENT OFFICE 2,435,026

WELDING CONTROL SYSTEM

Frederick A. Barnes, Cleveland Heights, Ohio, assignor to Bailey Meter Company, a corporation of Delaware Application June 26, 1944, Serial No. 542,209

18 Claims. (Cl. 219—4)

This invention relates to control systems, and particularly to the controlling of operations in definite relation to time or at a definite time rate, for example, so that a machine part, or the work, moves at a predetermined speed which may be a uniform speed or a speed varying in desired relation to time.

A particular object of my invention is to control the rate of movement of a movable part of a machine toward or away from a stationary part of the machine at a predetermined rate which may be a steady rate or a succession of different rates. For example, I may establish a sequence of movement rates which thereafter are accomplished automatically.

Hydraulic pressure is used to actuate practically every type of metal handling or working machine. The simplicity of this method of applying power lends smoothness of operation and flexibility of control. Certain types of machines require a variety of cutting speeds or feeds, changeable during operation. Presses, resistance welding machines, and the like require sequential operation of different sizes of pistons at perhaps different pressures or speed of travel. Shapers, planers, grinders, etc., require rapid approach to the work, slower movement over the work, and rapid return. All of these examples require sequential operation of one or more parts with time. A particular object of my present invention is to provide a control system providing sequential operation with time, and adapted to a wide variety of machines.

The use of oil as a hydraulic medium provides smooth, vibrationless action that is little affected by load variations, having lubricating value and a minimum of compressibility or corrosion effect. However, oil is subject to change in viscosity with temperature so that an oil having proper viscosity at operating temperature, may thicken excessively when the machine is not used. A changing viscosity as the machine warms up may result in a wide variation in speed of work or tool travel and may require a continual readjustment of what was intended to be an automatic machine or operation. Change in the characteristics of a hydraulic fluid is particularly undesirable in connection with the control for power cylinders; such as pilot valves and the like. In my present invention I desirably utilize oil as a medium in power cylinders, but use air throughout the control system for such power cylinders. I thus utilize a practically incompressible fluid in the locations where viscosity changes with temperature are of minimum effect; and utilize a fluid which is insensitive to viscosity change with temperature in the control system where volume rate, speed, direction and the like of the power pistons are established.

I have chosen as a preferred embodiment, to illustrate and describe my invention as applied to a resistance welding machine, although broadly speaking, it is adaptable to a wide variety of machines and operations. I do not, therefore, desire to be limited to my preferred embodiment.

In the drawings:

Fig. 1 diagrammatically illustrates the application of my invention to a resistance welding machine.

Fig. 2 illustrates a modification of Fig. 1.

Figs. 3, 4, 5 and 6 diagrammatically illustrate different cam arrangements for use in Fig. 1.

Fig. 7 is a modification of a part of Fig. 1.

Referring now in particular to Fig. 1, I illustrate therein a resistance welding machine 1 having a stationary part 2. A movable portion 3 is positionable along ways 4 through the agency of a hydraulic motor 5 having a piston rod 6. Inasmuch as welding machines of this general type are well known it seems unnecessary to go into greater detail as to construction of the machine 1. It also appears unnecessary to illustrate or describe well known electrical circuits and mechanisms for such a machine.

As a simple example I indicate that the machine 1 is desirably butt-welding together two pieces of tubing 7 and 8. The tubing 7 is held by jaws or other means on the movable portion 3 while the tubing 8 is held fixedly in the portion 2. When the movable portion 3 is advanced toward the stationary portion 2 the tubing 7 approaches the tubing 8 and eventually contacts it. Upon contact the electrical circuit is completed, the temperature of the contact area is elevated, and a weld of the pieces 7, 8 is accomplished.

In such a welding operation it has been determined to be desirable that the rate of movement or of applied pressure of the part 7 toward or upon the part 8 be different as the welding operation progresses. If the pressure between the parts is applied at too fast a rate the softened contact edges of the parts are squeezed out, producing an undesirably large bead surrounding the weld joint. If the parts contact too slowly or with too slow a pressure gradient then the arc may not persist or it may produce a porous or unsatisfactory weld joint. Preferably the pressure between the parts is applied at a rate approximating a parabolic function wherein a relatively smooth or uniform approach of the part 7 to the part 8 is accomplished; followed by a varying rate of pressure between the parts as the weld is accomplished. Different types and sizes of parts to be butt-welded or flash-welded may require a different gradation of movement or pressure between the parts and the accomplishment of such control of movement of the portion 3 of the machine forms a particular feature of my present invention.

In order that the forward movement of the piston rod 6 may bear a definite relation to time I control the passage of hydraulic fluid to or from the servo-motor 5 in accordance with the dictates of a time driven template 9 slidably mounted and positioned transversely (in the drawing) of the machine 1 through the agency of a rack 10 and pinion 11. The pinion 11 is driven through any convenient gear reduction means 12 by an electric motor 13 adapted to be reversed as to rotation by means of a double-pole double-throw switch 14.

For control of the servo-motor 5 I provide a tracer mechanism 15 supported by the movable portion 3 through a bracket 16 and having a feeler arm or tracer arm 17 adapted to engage the contact surface 18 of the template 9. The tracer assembly 15, 17 may take the form disclosed and claimed in my copending application Serial No. 524,705, entitled Control system. In general I may say that the tracer mechanism comprises a valve adapted to bleed a pressure fluid to the atmosphere. In the particular embodiment being described I supply the body 15 with compressed air through a pipe 19 at the discharge side of a restricting orifice 20 to which air is supplied at uniform pressure from a pressure regulator 21. It will be apparent that the pressure of the air in the pipe 19 will depend upon the rate of bleed to the atmosphere of air through the tracer mechanism 15. Such pressure is indicated upon a gage 22 and bears a definite relation to the deflection of the feeler arm 17 relative to the body 15.

Such air under pressure is effective upon the bellows 23 of a variable fluid resistance 24. I show an oil pump 25 driven by a motor 26 and drawing its supply of oil from a sump 27.

In connection with the servo-motor 5 and adjustable fluid resistance 24 I provide switching valves 28 and 29 arranged to be moved together to either a "normal" or a "rapid traverse" position of operation. The valves 28 and 29 are shown in Fig. 1 in the "normal" operating position. Oil under pressure from the pump 25 is forced through a pipe 30, the valve 29, and a pipe 31 to one end of a servo-motor 5. Oil from the other end of the motor passes through a pipe 32, the valve 29, the valve 28, a pipe 33, the adjustable fluid resistance 24 and a pipe 34 to the sump 27. Regulation of the variable resistance 24 determines the rate of flow of oil through the pipe 32, and consequently the rate of travel of the piston rod 6 toward the portion 2 of the machine 1. Thus the rate of approach of the work 7 toward the work 8 is controlled by the rate of passage of oil through the resistance 24 to the sump 27.

In Fig. 2 I show the passage relation of switching valves 28, 29 for a "rapid return" of the piston rod 6 upwardly in the drawing. That is for a rapid return of the portion 3 to the beginning of its working travel. Oil from the pump 25 passes directly through the pipe 30, the valve 29, and the pipe 32; while oil from the upper end of the cylinder 5 passes directly through the pipe 31, the valve 29, the valve 28, and pipe 34 to the sump 27. Thus on the rapid return of the piston rod 6 upwardly in the drawing there is no throttling of its speed of travel by the variable resistance 24, and thus the portion 3 is traversed to the beginning of its working stroke at maximum speed.

It will be appreciated that the template 9, as well as the motor 13, are individually provided with the necessary travel limits or limit switches so that the template 9 may be positioned between definite limits of travel smoothly at uniform speed determined by the gear ratio 12 between the motor 13 and pinion 11. Upon reaching either extreme of travel motor 13 is stopped and travel in the reverse direction may be accomplished by throwing the switch 14.

Preferably the control for the welding circuit as well as the switch 14 and valves 28, 29 are grouped conveniently to the operator. These various controls may be interlocked so that the advancing and retracting operation of the portion 3 is definitely tied to the welding circuit controls.

At the beginning of a cycle of operation the portion 3 is in its retracted position (upwardly on the drawing) and the template 9 is at its furthermost travel toward the right. The work pieces 7, 8 are fixed to the portions 3, 2 respectively. The valves 28, 29 are placed in the position shown in Fig. 1 and the switch 14 is closed to provide rotation of the motor 13 such that the template 9 moves toward the left in the drawing. According to the shape of the contact edge 18 of the template 9 the piston rod 6, portion 3, and work 7 move toward the work 8. If the surface 18 is a straight line inclined to a line normal to the axis of the machine 1, then there will be a deflection of the feeler 17 relative to the body 15 determined by the slope of 18 and a uniform rate of travel of the work 7 toward the work 8. In Fig. 1 the surface 18 is shown as having a rapidly increasing drop-off so that the travel of the work 7 toward the work 8, or the pressure applied between the work 7 and 8, is at an increasing rate with time as represented by rotation of the pinion 11.

It is apparent that through the mechanism and system described I may readily control the rate of approach of the work 7 toward the work 8 or the rate of applying pressure between the two parts during the welding operation. By properly shaping the surface 18 of the template 9 I may predetermine such rate of movement or rate of application of pressure.

In Fig. 3 I show a template 9 having a contact surface 18 embodying a sequence of movement as follows: A dwell for a portion of the cycle, a sudden rapid advance, a dwell, and finally an advance at an increasingly rapid rate of speed.

In Fig. 4 I indicate a jet nozzle 35 on the pipe 19 directing a discharge of air directly against the contact surface 18 of the template 9. Here again (as in Fig. 1) the back pressure created in the pipe 19 is used to control the variable fluid resistance 24. The rate of discharge of air from the pipe 19 through the nozzle 35 to the atmosphere is dependent upon the approach or recession of the surface 18 to the end of the nozzle 35.

In Fig. 5 I indicate that the surface 18 may be wrapped around a cylinder 36, thus permitting a continuous rotation of the contact surface 18 in a single direction without the necessity of back traveling to a starting point as in Fig. 1.

The drum 36 may be rotated at a uniform speed by a synchronous motor or other means representative of time. The contact surface 18 may be of the type shown or may comprise a groove or ridge in the surface of the cylinder 36.

In Fig. 6 a disc 37 may have a raised cam contact surface 18. Here again the assembly 37, 18 is to be rotated continuously at a uniform speed by a synchronous motor or other time device.

In Fig. 7 I indicate that the template 9 may be positioned by a servo-motor 38 through the agency of hydraulic means such as oil, compressed air, or the like. Provisions for uniform movement of the piston 39 may include hydraulic bleed valve or adjustable orifice admission of pressure at a uniform rate against the piston 39 as well as valve means for rapid return of the piston to the beginning of its controlling stroke. Certain features of such a timer, actuated through hydraulic or pneumatic means, are disclosed in the copending application of Clarence Johnson, Serial No. 542,149, entitled Control systems.

It will be apparent that the design and shape of the template 9 may incorporate a sequence of timing or of operation including the positioning of fluid control valves, the regulation of speeds, the starting and stopping of operation, and the like. It will also be evident that the template 9 may be physically moved or may be rotated and that its rate of movement may be regulated or predetermined. Preferably the movement of the template 9 (regardless of its shape or form) is accomplished by a time element such as clockwork, synchronous motor, or the like, and is representative of a time function.

Thus in general I contemplate the positioning of members, or the direction of operations, in accordance with the dictates of a time controlled pattern or sequence.

It will be apparent that while I have chosen to illustrate and describe a preferred embodiment of my invention as incorporated in a resistance welding machine nevertheless the invention is applicable to a wide variety of machines and/or operation.

What I claim as new, and desire to secure by Letters Patent of the United States, is:

1. In a control system for a resistance welding machine of the type having means to control the speed of approach and subsequent pressure of engagement between a plurality of work pieces to be welded by the resistance to passage of electricity through their area of contact, and including a plurality of work holding portions of the machine arranged for relative movement to bring the work pieces into engagement and to apply welding pressure between the work pieces, a hydraulic piston for relatively moving said portions, and means supplying a hydraulic fluid under pressure to the side of the piston producing relative approach of the work pieces and pressure between the work pieces upon contact thereof, the improvement therewith of pneumatic actuated means regulating release of fluid pressure from the other side of said piston to control the rate of travel of the piston and the rate of application of pressure upon contact of the work pieces, and time controlled program means controlling said regulating means to produce a predetermined rate of approach of the work pieces with time and thereafter a predetermined rate of applied pressure of the work pieces upon each other during the welding operation.

2. The combination of claim 1 wherein said regulating means comprises an adjustable fluid resistance, and a fluid pressure control couple positioning said fluid resistance.

3. The combination of claim 1 wherein said regulating means comprises an adjustable fluid resistance, a fluid pressure control couple for adjusting said fluid resistance, said couple comprising a two element bleed valve to atmosphere, one element positioned by and with said piston, and the other element positioned by the time controlled program means.

4. In a control system for a resistance welding machine of the type having means to control the speed of approach and subsequent pressure of engagement between a plurality of work pieces to be welded by the resistance to passage of electricity through their area of contact, including a plurality of work holding portions of the machine arranged for relative movement to bring the work pieces into engagement and to thereafter apply welding pressure between the work pieces, a hydraulic piston for relatively moving said portions, means supplying a hydraulic fluid under pressure to the side of the piston producing relative approach of the work pieces and pressure between the work pieces after contact thereof, the improvement therewith of an adjustable fluid resistance regulating release of fluid pressure from the other side of said piston to control the rate of travel of the piston and the rate of application of pressure upon contact of the work pieces, a control couple comprising a two element bleed valve to atmosphere establishing a fluid back pressure for adjusting said adjustable fluid resistance, one of the valve elements positioned by and with the piston representative of the relative position of the work piece, and a time driven program template representing desired sequential relative approach of the work pieces followed by relative applied pressure per increment of time over a predetermined operating cycle, the second element of said couple positioned by said template.

5. The combination of claim 4 wherein the template is positioned by a synchronous electric motor representative of uniform time rate.

6. The combination of claim 4 wherein the template is positioned by a hydraulic pressure representative of uniform time rate.

7. The combination of claim 4 including means to return said piston to the beginning of its travel following completion of an operating cycle.

8. In a metal working machine, in combination, means for relatively moving a plurality of portions of the machine to perform a work operation, and time driven program means for controlling such movement in accordance with a predetermined sequence of rate of relative movement per increment of time in an operating cycle, said program means including a template formed to represent desired sequential relative movement of the portions per increment of time, and synchronous motor means for positioning the template.

9. In a metal working machine, in combination, means for relatively moving a plurality of portions of the machine to perform a work operation, a program template controlling said means, a control couple having a portion positioned by the machine and a cooperating portion positioned by the template, and time means for positioning said template.

10. The combination of claim 9 in which said control couple comprises a fluid jet discharging to atmosphere whereby a fluid back pressure is established for controlling the first named means.

11. In a metal working machine, in combination, hydraulic means for relatively positioning portions of the machine, means for connecting said hydraulic means selectively to liquid supply means or to exhaust, pneumatic means controlling the flow of liquid relative to said hydraulic means, means for conducting a pressure fluid relative to said pneumatic means, and means operating on a predetermined time program for controlling the flow of pressure fluid through said fluid conducting means.

12. In a metal working machine, in combination, hydraulic means for relatively positioning portions of the machine, pneumatic means including a fluid jet feeler positioned by movement of a portion of the machine for controlling the hydraulic means, and time controlled program means regulating the pneumatic means, said time controlled program means including a uniformly driven pattern arranged to be scanned by said feeler as the portions of the machine are relatively positioned.

13. In a welding machine having relatively movable parts arranged in cooperative relation, hydraulically operated means for relatively positioning said parts, pneumatic means for controlling the hydraulically operated means, a feeler carried by one part of the machine for regulating the pneumatic means, and a time controlled program template arranged to be scanned by the feeler during relative motion of the machine parts.

14. In a welding machine having a stationary part, and a cooperating movable part, a source of hydraulic pressure fluid, a hydraulic motor for actuating said movable part, means for supplying hydraulic pressure fluid to one side of the motor and removing it from the other side at a selected rate, pneumatically operated means controlling the rate of removing the hydraulic fluid from the motor, and time controlled program means regulating the pneumatically operated means.

15. In a welding machine having a stationary part and a cooperating movable part, a hydraulic piston connected to said movable part, means for supplying hydraulic pressure fluid to one side of the piston and removing it from the other side at a variable rate, and means for varying the rate of removing the pressure fluid from the hydraulic piston, said means including a uniformly driven template and a feeler carried and positioned by the movable part of the machine and arranged to scan the template to produce a predetermined rate of approach of said parts and thereafter a predetermined rate of applied pressure to work pieces between said parts.

16. In a welding machine having a stationary part and a cooperating movable part, a hydraulic piston connected to said movable part, means for supplying hydraulic pressure fluid to one side of the piston and removing it from the other side at a variable rate, and pneumatically operated means for varying the rate of removing the pressure fluid from the hydraulic piston, said pneumatically operated means including a movable template, a pneumatic jet feeler carried by the movable part of the machine and arranged to scan said template, and a synchronous motor driving said template.

17. In a machine having a movable part actuatable by fluid for performing a work operation, in combination, means for conducting a fluid relative to said movable part for effecting movement thereof, means for controlling the flow of fluid through said conducting means in accordance with a predetermined sequence of rate of movement in an operating cycle, said controlling means including a cam element formed to represent the desired movement of said part, a control element cooperating with said cam element, and means for moving one of said elements relative to the other.

18. In a machine having a movable part actuatable by fluid for performing a work operation, in combination, means for conducting a fluid relative to said movable part for effecting movement thereof, means for controlling the flow of fluid through said conducting means to effect a predetermined sequence of rate of movement in an operating cycle, said controlling means including a cam element formed to represent the desired movement of said part, a control element carried by said movable part and cooperating with said cam element, and means for moving said cam element relative to said control element.

FREDERICK A. BARNES.

REFERENCES CITED

The following references are of record in the file of this patent:

UNITED STATES PATENTS

| Number | Name | Date |
|---|---|---|
| 1,676,282 | Phelps | July 10, 1928 |
| 1,957,759 | Coates et al. | May 8, 1934 |
| 2,002,007 | Hanson | May 21, 1935 |
| 2,015,914 | Weightman | Oct. 1, 1935 |
| 2,063,258 | Martin | Dec. 8, 1936 |
| 2,085,049 | Spire | June 29, 1937 |
| 2,126,903 | Martin | Aug. 16, 1938 |
| 2,224,733 | Konig et al. | Dec. 10, 1940 |
| 2,270,767 | Platz | Jan. 20, 1942 |
| 2,331,537 | Clark | Oct. 12, 1943 |
| 2,373,226 | Coates | Apr. 10, 1945 |

FOREIGN PATENTS

| Number | Country | Date |
|---|---|---|
| 380,659 | Great Britain | Nov. 24, 1927 |